United States Patent
Dictor et al.

(10) Patent No.: US 8,369,473 B2
(45) Date of Patent: Feb. 5, 2013

(54) DEVICE AND METHOD FOR THE AUTOMATED DECONTAMINATION OF A NUCLEAR FUEL ROD

(75) Inventors: Alain Dictor, St Just d'Ardeche (FR); Marc Fischer, Montelimar (FR)

(73) Assignee: Areva NC, Paris (FR)

( * ) Notice: Subject to any disclaimer, the term of this patent is extended or adjusted under 35 U.S.C. 154(b) by 813 days.

(21) Appl. No.: 12/096,364

(22) PCT Filed: Dec. 7, 2006

(86) PCT No.: PCT/EP2006/069428
§ 371 (c)(1),
(2), (4) Date: Oct. 27, 2008

(87) PCT Pub. No.: WO2007/065928
PCT Pub. Date: Jun. 14, 2007

(65) Prior Publication Data
US 2011/0116590 A1    May 19, 2011

(30) Foreign Application Priority Data
Dec. 9, 2005  (FR) ..................... 05 53810

(51) Int. Cl.
*G21C 19/00* (2006.01)
(52) U.S. Cl. ............. 376/310; 376/409; 134/6; 15/97.1
(58) Field of Classification Search .............. 376/310, 376/409; 134/6; 15/97, 97.1
See application file for complete search history.

(56) References Cited

U.S. PATENT DOCUMENTS

| | | | | |
|---|---|---|---|---|
| 3,708,818 A * | 1/1973 | Hotz | ............... | 15/97.1 |
| 4,135,448 A * | 1/1979 | Moestue | ............... | 101/425 |
| 4,580,185 A | 4/1986 | Clausen et al. | | |
| 4,860,883 A * | 8/1989 | Knaul et al. | ............... | 198/495 |
| 5,430,593 A | 7/1995 | Na | | |
| 5,753,048 A * | 5/1998 | Lippold et al. | ............... | 134/18 |
| 5,790,621 A | 8/1998 | Picco et al. | | |
| 2001/0045218 A1 * | 11/2001 | Gasparrini et al. | ............... | 134/6 |
| 2003/0189757 A1 | 10/2003 | Spiecker | | |
| 2008/0121248 A1 | 5/2008 | Turco et al. | | |

FOREIGN PATENT DOCUMENTS
CN      1089199 A      7/1994
(Continued)

OTHER PUBLICATIONS

French Preliminary Search Report in French Application No. FR 0452967, dated Jun. 27, 2005.

(Continued)

*Primary Examiner* — Ricardo Palabrica
(74) *Attorney, Agent, or Firm* — Nixon Peabody LLP

(57) ABSTRACT

A method for the surface tribological decontamination of nuclear fuel rods automates surface wiping by one or more bands of fabric. The band is distant from the axis of the rod, the rod is placed facing the band, and then the band is tensioned around the surface of the rod and moved. The rod may be immobile, moved in pure translation along its axis or with a wide-step helical movement. Preferably, the decontamination is carried by two bands simultaneously, so as to cover the total surface in one pass of the rod.

21 Claims, 2 Drawing Sheets

FOREIGN PATENT DOCUMENTS

| | | |
|---|---|---|
| EP | 0 100 428 | 2/1984 |
| EP | 0507641 A1 | 10/1992 |
| EP | 0520847 A1 | 12/1992 |
| EP | 0642846 A1 | 3/1995 |
| EP | 0 749 919 | 12/1996 |
| FR | 2 072 423 | 9/1971 |
| FR | 2 774 801 | 8/1999 |
| GB | 1 382 915 | 2/1975 |
| JP | 57-91499 | 6/1982 |
| JP | 62-66200 | 3/1987 |
| JP | 2-261584 | 10/1990 |
| JP | 5-58286 | 8/1993 |
| WO | 9407641 A1 | 4/1994 |
| WO | 95/19033 | 7/1995 |

OTHER PUBLICATIONS

Machine Translation: FR 2774801 to Picco et al., Aug. 1999.
Office Action in U.S. Appl. No. 11/793,109, dated Jan. 20, 2011.
Office Action in U.S. Appl. No. 11/793,109, dated Mar. 22, 2010.
Office Action in U.S. Appl. No. 11/793,109, dated Jun. 12, 2009.
International Search Report for International Application No. PCT/EP2006/069428 mailed Mar. 29, 2007.
Chinese Office Action in Chinese Application No. 200580041874.0, dated Jan. 27, 2011.

* cited by examiner

DEVICE AND METHOD FOR THE AUTOMATED DECONTAMINATION OF A NUCLEAR FUEL ROD

CROSS REFERENCE TO RELATED APPLICATIONS OR PRIORITY CLAIM

This application is a national phase of International Application No. PCT/EP2006/069428, entitled "DEVICE AND METHOD FOR THE AUTOMATED DECONTAMINATION OF A NUCLEAR FUEL ROD", which was filed on Dec. 7, 2006, and which claims priority of French Patent Application No. 05 53810, filed Dec. 9, 2005.

DESCRIPTION

1. Technical Field

The invention concerns the manufacture of nuclear fuel rods and in particular the surface cleaning and decontamination thereof.

The invention relates in particular to a novel automated method for eliminating any deposits of residues by the use of one or more bands sliding along the surface of a cylindrical object. Another object of the invention is an adapted device.

2. Prior Art

A nuclear fuel rod for a water reactor consists of fuel pellets with a diameter of around 8 mm, such as in particular $UO_2$ or a $UO_2$—$PO_2$ mixture, inserted one after another in a metal sheath, conventionally made from zirconium alloy, with a length of around 4 m. The rods can be stored before the formation of assemblies intended to be loaded into the reactor.

The fuel rods, once produced, do not give off any radioactivity as such. However, in particular when the pellets resulting from sintered powder are introduced, particles of fuel may be generated and deposited on their surface. The contamination of the rod caused by these residues must be removed in the light of the strict tolerated and/or acceptable radioactivity criteria.

To this end, before the rod is taken out of the manufacturing glove box, it is usual for a decontamination step to be provided, in particular for the top plug of the rod and the adjacent surface. The decontamination must of course not alter the rod sheath; it is also desirable for it to be completely automatable and relatively rapid and not to give rise to an unacceptable space requirement in the glove box.

Various techniques have been developed. For example, pressurised gas or solution jets (EP 0 100 428) may make it possible to remove the deposit of submicron particles of fuel, but give rise to effluents that it is difficult and expensive to process. Other systems, comprising for example electrode discharges (GB 1 382 915), are very expensive to implement; laser decontamination (FR 2 774 801) has been envisaged, but remains very complex to use.

The most simple technique remains tribological decontamination by the use of a viscose, polyester or cotton fabric, dry or soaked in alcohol, which is however greatly dependent on human operators.

Automation was certainly described in the document FR 2 072 423, where the rod is driven in a rotating movement and its end is brought into contact with an unwinding cleaning band. This solution is however limited geographically to the end of the rod and has not demonstrated its effectiveness in the light of the lack of reliability and the pressure exerted between band and rod.

DISCLOSURE OF THE INVENTION

The invention overall proposes, among other advantages, to mitigate the drawbacks described above and to develop an automated tribological decontamination (by wiping by band). The method and device according to the invention are in particular intended to bring the contamination of rods after sheathing to a level lower than environmental specifications, but may be applied to other usages.

In one of its aspects, the invention relates to a method of surface cleaning of a cylindrical element by passing a band. The invention finds a particular application in the decontamination of nuclear fuel rods and to the cleaning of the rods before they are sealed.

The decontamination method according to the invention comprises the placing of the length of cylinder to be decontaminated at a predetermined position, the tensioning of the band around the cylinder and the movement of the band in a direction perpendicular to the axis of the cylinder. During the cleaning by a method according to the invention, the tension of the band remains constant; the length of cylinder can be kept fixed or it may undergo a translation along it axis, at a constant speed of movement or comprising stages of slowing down in order to focus on a portion of the length; this translation may be accompanied by a slight rotation, so that the cylinder is driving in a helical movement, but it is preferable for the length to be kept in the same angular position throughout the process.

According to one embodiment of the invention, once the length of cylinder has been cleaned during at least one translational passage without rotation, the cylinder undergoes a rotation about its axis and is repositioned at the predetermined point so that the band is in contact with an arc different from the first: the process is thus repeated in order to result in a complete peripheral cleaning.

According to a preferred embodiment, the method according to the invention carries out the surface cleaning with at least two bands simultaneously, the bands being located one after the other in the direction of translation of the cylinder, advantageously with rotation reversed from one band with respect to the other, and preferably exerting the same pressure on the cylinder. In particular, the plurality of bands defines arcs with complementary contact with the length of cylinder, for example two bands cover two half cylinders opposite to each other.

The method according to the invention can be carried out dry and/or wet, with injection of liquid onto the band, in particular in the case of a final decontamination.

The invention also relates to a device adapted to the method. Preferably, the entire device can be placed in a glove box.

The device comprises a system for unwinding a band; in particular, the unwinding system comprises a drive roller and a driven roller with axes parallel to the axis of a cylinder to be cleaned. Means of automated positioning of a band are located on a path going from the drive roller to the driven roller passing around the cylinder, the means being adapted so that the arc of the cylinder surrounded by the band is constant and so that the cylinder can be put in place without coming into contact with the band. In particular, the positioning means comprise a device for moving the band radially with respect to the axis of the cylinder to allow frictionless passage of the cylinder over the band. The positioning means can also comprise a rocker providing constant tension; preferably the winding arc forms half of the cylinder.

The device can comprise means for moving a cylinder in translation and giving it a given angular position.

Advantageously, control means are provided, for example a band rupture sensor, a brake system on the driven roller, a position sensor for the cylinder, and means of determining the speeds of the band and/or cylinder.

Preferably the device comprises a plurality of systems for unwinding a band, advantageously identical, located along the axis of the cylinder and defining different winding arcs, preferably complementary.

BRIEF DESCRIPTION OF THE DRAWINGS

The characteristics and advantages of the invention will be better understood from a reading of the description that follows and with reference to the accompanying drawings, given by way of illustration and in no way limitative.

DETAILED DISCLOSURE OF PARTICULAR EMBODIMENTS

The total radioactive contamination of a sample, such as a fuel rod, consists of a so-called labile, or transferable, contamination resulting from a surface deposition of particles, and possibly a fixed contamination; the standard criteria for a rod are total residual contamination of less than 0.8 $Bq/cm^2$ and a labile residual contamination of less than $4.10^{-2}$ $Bq/cm^2$.

The method according to the invention acts mainly on labile contamination; however, by the injection of liquid in particular, an elimination of embedded particles may also be obtained.

Figure 1:
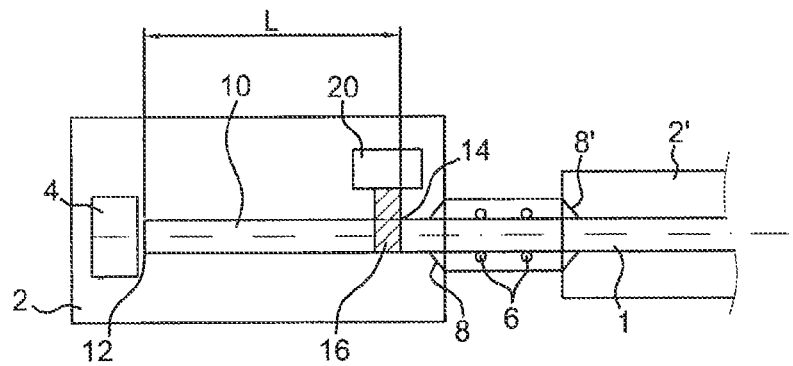
FIG. 1 illustrates schematically a module for manufacturing a nuclear fuel rod in which a device according to the invention can be implemented.

The manufacture of the rods 1 is carried in a glove box system illustrated in FIG. 1. The glove boxes thus form functional sealed modules 2, 2' in which the rods 1, with a normal diameter of approximately 9.5 to 12.5 mm, for a length of around 4 m, are at least partially inserted, in order to come to be connected with accessories 4 such as plugs or sheathing nose facilitating the operations, by movement by adapted mechanisms 6 that allow their translation and rotation. In particular, for loading pellets, a rod sheath 1 is introduced through a sealed passage 8 into a hermetic module 2 dedicated to filling, and comes up against a sheathing nose 4 specially designed to limit the formation of residues of pellets. In fact, only the part 10 of the sheath 1 close to the sheathing nose inserted in the module 2 is liable to be contaminated.

At the end of this step, the rod 1 is opened and filled with pellets constituting a column slightly less long that the rod 1; it is normally considered that the part 10 of the rod 1 liable to be contaminated extends over a length L of around 50 mm for this step. This filling step is normally concluded by an operation termed "frontal peripheral cleaning", taking place in another functional module 2, which aims to eliminate the residues on the part 10 subject to contamination.

The rod 1 is then transferred to another working module 2, in which a spring is fitted inside the sheath, in order to provide a junction between the pellets whilst tolerating a change in the volume of gas contained in the sheath during the fission operations. A plug then closes the rod 1; connection is effected by a circular welding of the plug on the sheath and then pressurisation before sealing (or pinching off, axial or radial).

The rod 1 is ready; but, before being stored, it is normally subjected to a last operation termed "final decontamination", which eliminates any residues. The length 10 thus decontaminated here often covers a minimum length L of 500 mm as from the inlet end 10 or top plug of the rod 1, ranging as far as the whole of the sheath.

The method and device according to the invention are adapted for these two operations of "frontal peripheral cleaning" and "final decontamination", possible modifying a few parameters. For reasons of conciseness, the two operations are indifferently referred to hereinafter as surface cleaning, or decontamination, by band, and concern a length 10 of cylinder 1 extending along its axis AA between a first inlet end 12 and a proximal end 14 distant by a length L that may be as much as the total length of the rod 1. More particularly, in the preferred embodiment, the device 20 according to the invention is adapted to the decontamination of the end part 10 of a nuclear fuel rod 1, that is to say an end portion 10 of cylinder 1 with a diameter of around 9.5 to 12.5 mm, and a length L of approximately 50 or 500 mm; the device and method can also be used for a "repair" of rods, that is to say on a portion 10 of the rod that is not at the end.

Figure 2A:
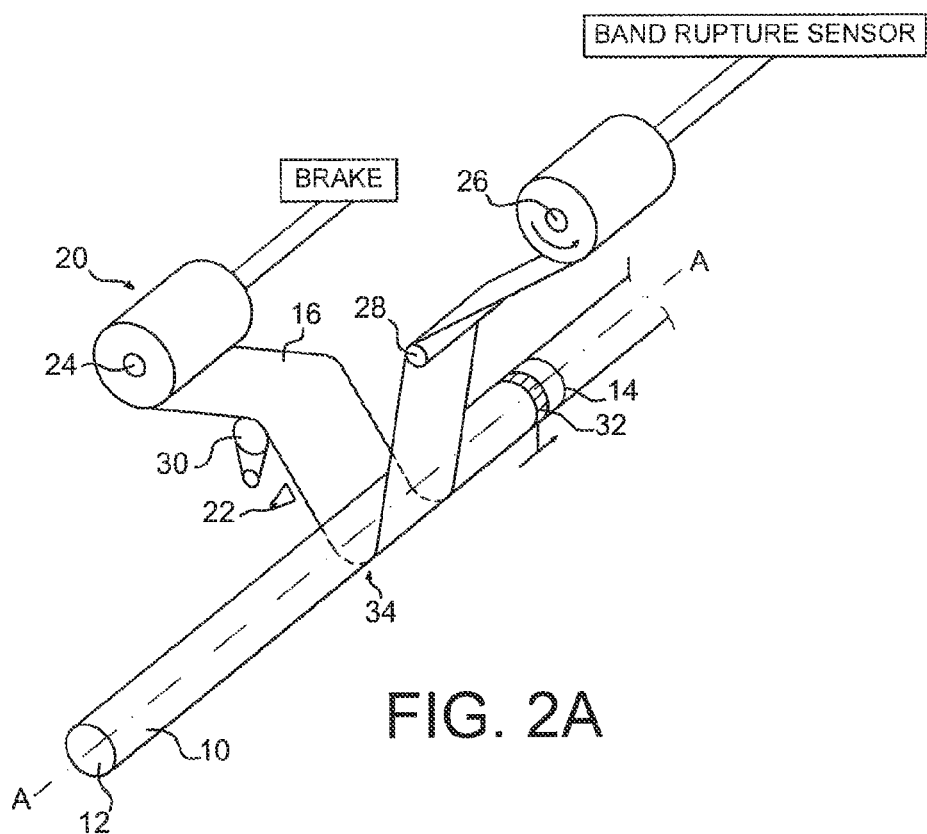
FIGS. 2A and 2B show a preferred embodiment of the device according to the invention.
Figure 2B:
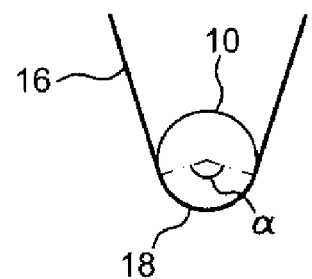

The decontamination device according to the invention, shown schematically in FIG. 2A, makes it possible to achieve, in an automated, controlled and reproducible fashion, a wiping of a band 16 of fabric over the surface of a cylindrical length 10. In this particular application, the band 16 is fitted around an arc 18 of the periphery of the length 10 (see FIG. 2B), a certain tension is applied to it, and then the band 16 undergoes a relative movement with respect to the cylinder 1, in a direction orthogonal to the axis AA of the sheath 10. The cleaning can take place dry, or it may be associated with the injection of liquid, normally alcohol, in order to wet the band 16 (the labile decontamination factor may thus for example pass from 2.5 for dry cleaning to more than 10).

The band 16 is adapted to its specific use; in particular, it is desirable for it not to alter the surface of the rod 1. Preferably, the coefficient of removal of labile dust of the band 16 is optimised; if a "wet" decontamination is envisaged, it is also preferable for the band 16 not to be too absorbent, in order to allow a lower consumption of liquid to be recycled.

Advantageously, it is a case of a cotton fabric of the Vanneuville type; the width 1 of the band 16 is advantageously 60 mm in order to provide an optimal compromise between the speed of decontamination and evenness of the tension exerted on the band 16 at the sheath 10. An adapted abrasive band can however be recommended in the case of strong (de)contamination and used in the same device 20 according to the invention.

Advantageously, means, such as an injection nozzle 22, wet the band 16 in order if necessary to be able to proceed with wet decontamination, conventionally with alcohol.

The band 16 is, as usual, preferably stored in the form of a reel, comprising for example a useful band length of 100 to 150 m. It is driven in a translation movement; for unwinding, as is conventional, the device 20 comprises a set of two rollers; a distributor roller 24 supplies the system with a decontamination band 16 proper, and a receiving roller 26 winds up the "dirty" band; the axis of the rollers 24, 26 may for example be around 40 mm or 50 mm, so that the maximum diameter of the reels is around 200 mm. Advantageously, the supply reel is free to rotate, the roller 24 preferably being equipped with a mechanical resisting torque providing the tension for the band 126. The receiving reel and its roller 26 are driven by a drive: a retractable roller/motor assembly, preferably equipped with a gearbox and a direction of travel at two speeds, makes it possible for example to pull the band 16 by gripping.

The set of rollers 24, 26 is preferably configured for an adjustment torque of 2.5 mN, which allows a force on the fabric of the band 16 of 12.5 N when the reel is empty and 2.5 N when it is full.

For the cleaning operation, the band 16 is placed in contact with the rod 1 between the two rollers 24, 26: means 28, 30, such as a capstan, a set of directional rollers and/or pulleys and/or curved detour rollers make it possible to position the band 16 and keep it centred on the rod 1 in order to optimise its path and to surround it over an arc 18 with a predetermined angle α while complying with the recommend speed of movement and tension of the band 16. In particular, a rocker 30 can be positioned on the path of the band 16, upstream of the rod 1, to allow relative movements and compensate for any irregularities in the routing of the band 16.

When the band 16 is put in place on the rod 10, no rubbing takes place: the positioning means 28, 30 are associated with a device allowing movement in a direction perpendicular to the axis AA of the rod 1: for example, the capstan 28 is mounted on a double-acting rotary pneumatic cylinder controlled by bistable electropneumatically controlled valve under nitrogen fluid in order to be able to leave clear the passage of the cylinder 1. Once the band 16 and the length 10 are put in place, a device 20 allows the movement of the band 16 between the two rollers 24, 26, so that its friction with the cylinder decontaminates the sheath.

The set 20 of different elements is advantageously located in the glove box 2 and composed of non-contaminant materials.

According to the length L of the length 10 and the width 1 of the band 16, this single pass may not be sufficient. It is then desirable for the cylindrical element 10 to be driven in a translation movement along its axis AA: adapted means allow the movement. It is preferable for the cylindrical element 10 not to undergo any rotation about its axis AA: the same arc of a surface 18 with edges parallel to the axis AA is cleaned by the band 16 over the entire length of movement in order to obtain even decontamination of the arc 18 concerned. It is however possible to associate a slight rotation of the cylinder 1 during its translation for final decontamination over a great length of rod: the broad-step helical movement makes it possible to avoid a junction line between several passes when the distance covered exceeds 100 mm.

A guide element, in particular a rail or rollers, makes it possible to direct the sheath 1 within the decontamination module 2 perpendicular to the axes of the rollers 24, 26 and therefore to the movement of the band 16: in addition, means 32 keep the rod 1 in rotation and move it in translation along its axis AA. Advantageously, it is a case of the same device 32 allowing the translational movement of the rod 1 and its holding about its axis AA, for example a rotary mandrel mounted on a carriage in translation; the translation and rotation movements can thus be coupled or decoupled.

According to the organisation of the modules, the cleaning can be carried out by "advancement" of the rod, that is to say the rod is cleaned whilst it passes right through the module; it is also possible for the translation of the rod to take place during its retraction, in particular if only a small part of an end is concerned: the rod 1 is entered as far as possible into the cleaning module 2, and will be extracted from this module 2 conjointly with the passage of the band 16 and decontamination. "Proximal" will hereinafter mean the "start" of decontamination end, and "distal" will mean the end of contamination end, the length 10 moving by "retraction" between the proximal end and the distal end.

Thus, for example, for final decontamination at the end of the pinching off, the rod 1 has entered the first module 2, the band 16 being in the slack position around the axis AA: the band 16 is pressed on the rod 1 by action on the capstan 28, with the exercising of a pressure by the rocker 30, in its downstream end being positioned on the proximal end 14 of the length (a position sensor 34 can be associated with the device 20): the band 16 covers an arc 18 of the periphery of the cylinder 1, in particular an arc of $\alpha=360/n°$, with n an integer. Next, the cleaning proper commences: conjointly, the band 16 advances, and the rod 1 retracts, until the eventual separation of the band 16 from the end 12 of the rod 1.

In order to avoid slaving of the helical movement, it is possible to entirely decouple the two movements and to make the rod 1 advance in steps according to the following sequence:

i) pressing the band 16 on the rod 1;
ii) advancement of the band 16;
iii) stoppage of the band 16;
iv) rotation of the rod 1 through $\alpha=360/n°$ by action on v) the means 28, 30 of positioning the band 16;
vi) repetition of steps ii) to iv) n times;
vii) release of the pressure of the band 16 on the rod 1; translation of the rod 1 by the width L of the band 16;
viii) repetition of steps i) to vi) at least L/1 times, that is to say as long as L is not reached.

This disjointed method is particularly suitable for repairs, where the length L is not very high ($L/1 \leq 3$), but it does however give rise to errors and is time consuming.

Advantageously, the movements of the band 16 and rod 1 are simultaneous: once the band 16 is tensioned around the length 10, the band 16 is unwound, at constant speed if uniformity and reproducibility are particularly desired, while the rod 1 is retracted at a given speed. Cleaning of the arc 18 by an angle $\alpha=360/n°$ is thus carried out over the length L of the length 10.

In order to ensure cleaning of the entire surface, the rod 1 is then repositioned in its initial position, that is to say advanced until its proximal end 14 is situated facing the front end of the band 16, undergoing a rotation of $360/n°$, such that the arc α' covered by the band 16 is adjacent to the first: or the rod is turned through $360/n°$ and then cleaned by pressure of the band 16 from its proximal end 14 to its distal end 12. This step is repeated n times, so as to obtain decontamination of the entire periphery. For example, if the capstan 28 and rocker 230 enable the band 16 to cover an angle α of 180°, two passes between band 16 and rod 1 are sufficient for cleaning of the peripheral surface; it is also possible to have 3 passes a 120°, or 4 at 90°; it is also possible to carry out the decontamination several times (with for example four passes at 180°).

Advantageously, a decontamination of the entry/exit guides 8 of the module 2 is carried out in parallel between two passes.

Preferably, in order to optimise the cleaning time, several bands 16, 16' are disposed along the length 10. Advantageously, they cover each of the arcs 18, 18' of complementary or identical angles α, in particular, two bands 16, 16' are disposed one behind the other along the axis AA each covering opposite 180 degrees: during a single pass of the rod 1, the total surface is then decontaminated. Each band 16, 16' is associated with similar positioning and tensioning means.

Figure 3A:
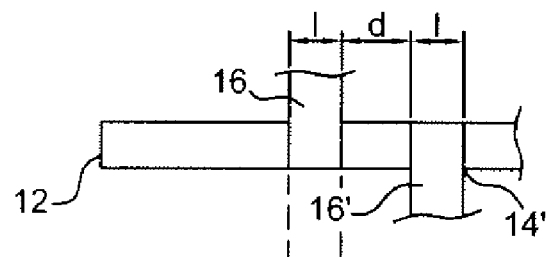
FIGS. 3A and 3B depict the state of decontamination according to another preferred embodiment of the invention.
Figure 3B:
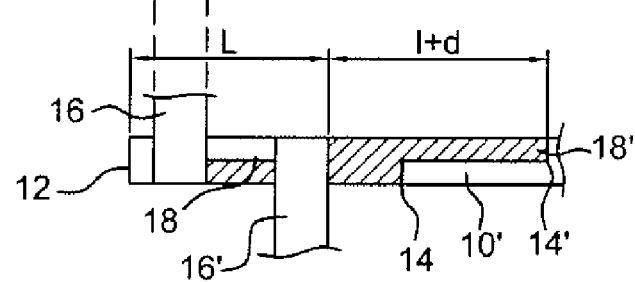

It possible also to combine the two solutions and to have for example two bands 16, 16' for covering $\alpha+\alpha'=180°$ and then to make a second pass after rotation of the rod 1 by a half-turn.

Where several bands are used simultaneously, it may be important to take account of the width 1 of the band 16 and the spacing d between the bands 16, 16': as illustrated in FIG. 3, part of the surface of the length 10 will be decontaminated only by the band 16' situated upstream. The position 14' of placing the length 10 is therefore advanced accordingly, and the partially cleaned length is L+e+d. It is thus desirable to use only two bands 16, 16' in order to minimise the incompletely decontaminated part.

The sequence of decontamination by two bands thus becomes for example:

i) descent of the capstans 28;
ii) positioning of the length 10' in the cleaning position;
iii) tensioning of the bands 16, 16' on the length 10' from a dimension 14' defined according to the distance L to be cleaned;
iv) unwinding of the bands 16, 16' and movement of the rod 1 as far as its end 12.

It may be desirable to emphasise the cleaning of part of the length 10, in principle more liable to be contaminated, for example by slowing down or even stopping the translation of the rod 1 in its vicinity. In particular a time delay may be permitted when the band 16 arrives at the end 12 of the rod 1 before it disengages from it. For this purpose, advantageously, a sensor 34 determines the movement of the length 10; preferably, the sensor 34 can be associated with means for parameterising the length L to be cleaned. Such a time delay can of course be carried out at any point on the length 10, in particular where a repair is to be carried out.

In the case of a cleaning with two bands, to allow thorough even cleaning over such a portion, the rod 1 is immobilised while the first band 16 continues to travel, the second band 16' being able to be stopped. The rod 1 is then moved so that the second band 16' is also at the position of the previous portion, and remains in place there for a period preferably identical to the stoppage caused for the first band 16.

In addition, it is possible also to temporarily use the injection of liquid on the band 16 for specific parts of the length 10, or over its entire length L. In particular, in the case of final decontamination, a decontamination with alcohol close to the plug 12, over a length L' of around 300 mm, is desirable; advantageously, it is preceded by a dry cleaning over the length L-L'.

In the context of an industrial configuration in particular, various parameters can be set in order to optimise the decontamination, both in terms of final threshold obtained and speed of implementation of the method: in the usual cases, the tension of the band 16 would have to be greater than 1 kg, preferably around 1.5 kg; the speed of the band 16, 16' is around 40 mm/s for wet decontamination and 10 mm/s for dry wiping, for a movement of the rod of around 50 mm/s. The speeds are parameterised so as to be adapted to the level of contamination.

Advantageously, it is desirable for all the parameters to be able to be modified and for the device 20 according to the invention to be associated with a system of the programmable automatic controller type in order to adapt the cleaning to the particular rods 1 concerned. For example, the system may make provision for an entry of the parameters concerning the distance L to be cleaned, the calculation of the dimension 14' for positioning of the rod 1 with respect to the bands 16 and taking account of the width 1 and the spacing d of the bands in order to avoid partial cleaning, the speed of translation of the rod, the cleaning time for the end 12, the number of passes if the sum of the arcs 18 does not make 360°, etc.

In addition, the device 20 according to the invention advantageously comprises band rupture sensors and an inductive sensor on each band in order to monitor its travel.

The invention claimed is:

1. Device for the automated cleaning of a length part of a revolution cylinder driven in a translation movement along a longitudinal axis AA by wiping with a band, comprising:
   a drive roller able to coil a band and driven roller able to unwind the band, the rollers being rotational on axes parallel to the axis AA;
   positioning means for positioning the band with respect to the axis AA between a first position in which said band defines a first given contact arc around the axis AA and a second position in which said band adopts a more distant position without contact with the axis AA or a slack position around the axis AA, the means allowing the band covering an arc of $\alpha=360°/n$ of the periphery of the cylinder, with n is an integer.

2. Device according to claim 1, in which at least one driven roller comprises a brake.

3. Device according to claim 1, comprising at least one band rupture sensor.

4. Device according to claim 1, comprising a nozzle for injecting liquid onto a band.

5. Device according to claim 1, also comprising means of guiding a cylinder in a translation movement along the axis AA inside the device for the automated cleaning and between the positioning means.

6. Device according to claim 5, in which the guide means are able to maintain the cylindrical length in a plurality of given angular positions.

7. Device according to claim 1, comprising means for determining the speed of rotation of the drive rollers, and the speed of movement of the guide means.

8. Device according to claim 1, comprising a sensor for determining the position of the cylindrical length part with a respect to its movement axis.

9. Device according to claim 1, associated with a glove box in which it is located.

10. Device according to claim 1, wherein positioning means are located on a passage of the band circulating between the two rollers and around the length part of the revolution cylinder.

11. Device according to claim 1, $\alpha$ being equal to 180° or 120° or 90°.

12. Device according to claim 1, the positioning means are associated with a device allowing movement in a direction perpendicular to the axis AA.

13. Device according to claim 1, in which the positioning means for positioning the band comprise a capstan and a rocket.

14. Device according to claim 13, the band being positioned by the capstan and kept centred on the axis AA in order to optimise its path and to surround the axis AA.

15. Device according to claim 13, the band being pressed by the capstan on the axis AA.

16. Device according to claim 13, the capstan positioning the band on the axis AA over an arc with a predetermined angle $\alpha$ while complying with the recommend speed of movement and tension of the band.

17. Device according to claim 13, the capstan being mounted on a double-acting rotary pneumatic cylinder controlled by bistable electropneumatically controlled valve under nitrogen fluid in order to be able to leave clear the passage of the cylinder 1.

18. Device according to claim 13, the rocker being positioned on the path of the band, upstream of axis AA, to allow relative movements and compensate for any irregularities in the routeing of the band.

19. Device according to claim 13, the rocker being positioned on the path of the band to provide a pressure and a constant tension of the band.

20. Device according to claim 5, the means of guiding giving a given angular position to the cylinder.

21. Device according to claim 20, the means of guiding being a rotary mandrel mounted on a carriage in translation; the translation and rotation movements can be coupled or decoupled.

* * * * *

UNITED STATES PATENT AND TRADEMARK OFFICE
CERTIFICATE OF CORRECTION

PATENT NO.       : 8,369,473 B2                                               Page 1 of 1
APPLICATION NO. : 12/096364
DATED            : February 5, 2013
INVENTOR(S)      : Dictor et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1081 days.

Signed and Sealed this
First Day of September, 2015

Michelle K. Lee
*Director of the United States Patent and Trademark Office*